3,488,337
COPOLYMERIC REACTION PRODUCT OF POLY-
VINYL ALCOHOL AND A BORATE ESTER OF
PENTAERYTHRITOL
James R. Jones, Lancaster, Pa., assignor to Armstrong
Cork Company, Lancaster, Pa., a corporation of
Pennsylvania
No Drawing. Filed May 22, 1967, Ser. No. 640,347
Int. Cl. C08f 27/12
U.S. Cl. 260—91.3    3 Claims

ABSTRACT OF THE DISCLOSURE

A flame retardant copolymeric reaction product prepared from polyvinyl alcohol and a mono and/or diborate ester of pentaerythritol.

Summary of the invention

This invention relates to a novel class of flame and/or fire retardant copolymeric reaction products. The copolymers are prepared by reacting a mono or diborate ester of pentaerythritol or mixtures thereof with polyvinyl alcohol in the presence of an acid catalyst.

Detailed description

In accordance with this invention, boric acid is reacted with pentaerythritol to form the borate ester of pentaerythritol following which the borate ester is reacted with polyvinyl alcohol to form the new class of copolymeric compositions. Dependent on the relative proportions of initial reactants, either the monoborate ester of pentaerythritol or the diborate ester of pentaerythritol or mixtures thereof are formed and the resultant reaction product with polyvinyl alcohol may be a polyvinyl alcohol backbone having the reacted borate ester groups along the chain or polyvinyl alcohol chains cross-linked with the diborate ester of pentaerythritol or mixtures thereof.

In accordance with the preferred synthesis of the copolymers of this invention, boric acid is added to an alcohol, preferably methanol and stirred until in solution, after which pentaerythritol is added followed by the addition of an acid catalyst, preferably hydrochloric acid. This mixture is then heated to an elevated temperature, preferably to reflux and, upon completion of the esterification reaction, polyvinyl alcohol is added and the reflux continued to react the borate ester with the available hydroxyl groups in the polyvinyl alcohol chains. Preferably, the mol ratio of borate ester to polyvinyl alcohol is in the range of 0.1:1 to 1:2 based on 100% hydrolysed polyvinyl alcohol.

The following examples will illustrate the invention:

EXAMPLE 1

Ninety-three grams (1.5 mol) of boric acid was added to 1 liter of methanol and stirred until in solution. After solution was complete, 204 grams (1.5 mol) of pentaerythritol was added followed immediately by the addition of 13.5 grams of 37% hydrochloric acid (5 grams of HCl). This mixture was then heated to reflux for three hours after which 66 grams (1.5 mol) of polyvinyl alcohol [1] was added and the reflux continued for an additional three hours after which the reaction mixture was cooled to room temperature. The resultant methanolic solution was now quite viscous. The postulated copolymer structure is:

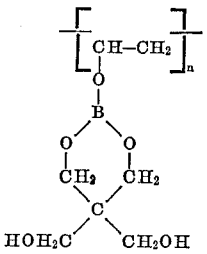

EXAMPLE 2

One hundred twenty-four grams (2.0 mols) of boric acid was added to 1 liter of methanol and stirred until in solution. After solution was complete, 136 grams (1.0 mol) of pentaerythritol was added followed immediately by the addition of 13.5 grams of 37% hydrochloric acid (5 grams of HCl). This mixture was heated to reflux for three hours after which 88 grams (2.0 mols) of polyvinyl alcohol [1] was added and the reflux continued for an additional three hours. The reaction mixture was then cooled to room temperature. The resulting methanolic solution, quite viscous, can be used as is. The postulated copolymer structure is:

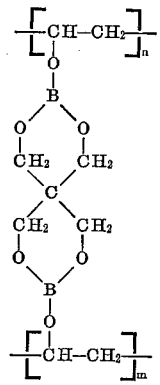

The reaction sequence illustrated in Example 2 is believed to be as follows:

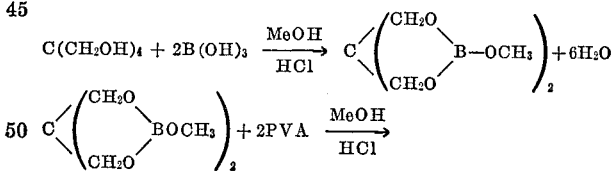

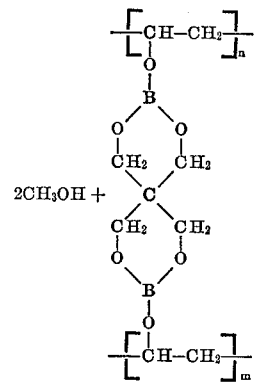

---

[1] E. I. du Pont de Nemours 70–05 grade—100% hydrolysed polyvinyl alcohol.

The copolymeric boron-containing material produced in accordance with this invention finds utility as an adhesive, binder, protective coating and as a flame retardant polymer. To illustrate the utility of the polymer, particularly in the areas of binders and protective coatings where flame retardancy is of utmost importance, the following tables summarize some of the physical properties of the polymer prepared in accordance with Example 2.

Wood-to-wood adhesive using maple blocks

The copolymer prepared in accordance with Example 2 was used, as is, as an adhesive for bonding maple blocks and, on the basis of ten test samples prepared and evaluated for shear strength using a Baldwin Southwalk Universal Tester loaded at 0.015 inch per minute at 73.4° F., in which the polymer was used to bond a 1½ square inch area between two maple blocks, the polymer showed an average shear strength of 604 p.s.i.

Fireproof adhesives

A series of samples were made up in which the copolymer formed in accordance with Example 2 was used, as is, to bond several types of materials. The following table sets forth the results:

TABLE 1

| Materials Bonded | Exposure (Temp. and Time) | Resultant Bond |
|---|---|---|
| (A) ⅛" cork sheet to ½" primed starch bonded mineral wool tile. | 1,300° F. for 15 minutes. | Tightly bonded. |
| (B) ½" primed starch bonded mineral wool tile to ½" primed starch bonded mineral wool tile. | 2,000° F. for 30 minutes. | Bond held when tiles were held under their own weight. |
| (C) ½" primed starch bonded mineral wool tile to ½" gypsum board. | 320° F. for several hrs. | No loss of adhesive strength. |

In a larger scale test, a ⅝" gypsum board was adhered to a ½" primed starch bonded mineral wool board with the boron copolymer prepared in accordance with Example 2. This partition assembly was fire tested. Time of failure due to heat transmission through the partition (250° F. temperature rise) was two hours and four minutes, indicating a two hour fire rated assembly. At the end of the test the partition remainded intact.

I claim:
1. A polyvinyl alcohol copolymeric composition having borate ester groups pendant from said polyvinyl alcohol chain and comprising the reaction product formed by refluxing polyvinyl alcohol and a member selected from the class consisting of borate esters of the formula:

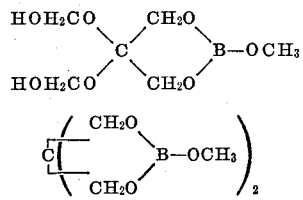

and mixtures thereof in the presence of an acid catalyst, the mol ratio of borate ester to polyvinyl alcohol being in the range of 0.1:1 to 1:2, based on 100% hydrolyzed polyvinyl alcohol.

2. A boron-containing copolymeric composition in accordance with claim 1 comprising the reaction product of polyvinyl alcohol and the monoborate ester of pentaerythritol.

3. A boron-containing copolymeric composition in accordance with claim 1 comprising the reaction product of polyvinyl alcohol and the diborate ester of pentaerythritol.

References Cited

UNITED STATES PATENTS 2,945,014   7/1960   Hartley _____ 260—87.3

JOSEPH L. SCHOFER, Primary Examiner

S. M. LEVIN, Assistant Examiner

U.S. Cl. X.R.

161—211, 216, 270, 271